(12) United States Patent
Xu

(10) Patent No.: US 8,441,207 B2
(45) Date of Patent: May 14, 2013

(54) LED STREETLIGHT CIRCUIT

(75) Inventor: Jianhua Xu, Shenzhen (CN)

(73) Assignee: Shenzhen Lvsun Electronics Technology Co., Ltd, Shenzhen (CN)

( * ) Notice: Subject to any disclaimer, the term of this patent is extended or adjusted under 35 U.S.C. 154(b) by 247 days.

(21) Appl. No.: 13/094,837

(22) Filed: Apr. 27, 2011

(65) Prior Publication Data

US 2012/0274232 A1    Nov. 1, 2012

(51) Int. Cl.
 *H05B 37/02* (2006.01)
(52) U.S. Cl.
 USPC ............ 315/294; 315/307; 315/224; 315/247
(58) Field of Classification Search .............. 315/209 R, 315/219, 224, 247, 291, 294, 307–309
 See application file for complete search history.

(56) References Cited

U.S. PATENT DOCUMENTS

| | | | | |
|---|---|---|---|---|
| 7,084,582 | B2 * | 8/2006 | Buonocunto | 315/247 |
| 7,262,559 | B2 * | 8/2007 | Tripathi et al. | 315/291 |
| 2007/0040516 | A1 * | 2/2007 | Chen | 315/291 |
| 2011/0115408 | A1 * | 5/2011 | Fannin | 315/294 |

* cited by examiner

*Primary Examiner* — Don Le

(57) ABSTRACT

An LED streetlight circuit includes an AC power supply, a switching circuit, an output controller and an LED array connected to the output controller. The switching circuit includes an EMI filter connected to the AC power supply, a power factor corrector connected to the EMI filter, a transformer connected to the power factor corrector, a rectifier/filter connected to the transformer, a standby power supply connected to the power factor corrector, a controller connected to the transformer, an luminance regulator connected to the controller, an optical coupler controlling loop connected to the controller and the rectifier/filter, and an optically controlled switch for connecting the standby power supply to the optical coupler controlling loop. The output controller includes a CC/CV controller connected to the rectifier/filter and the optical coupler controlling loop, an output voltage regulator connected to the CC/CV controller, and an output current regulator connected to the CC/CV controller.

7 Claims, 6 Drawing Sheets

LED STREETLIGHT CIRCUIT

BACKGROUND OF INVENTION

1. Field of Invention

The present invention relates to a light-emitting diode ("LED") and, more particularly, to an LED streetlight circuit.

2. Related Prior Art

An LED is economic regarding the consumption of energy, durable and environmentally friendly. An LED is a typical green-light illuminator. There is a trend to use LED streetlights. The use of an LED is however not without any problems. After an LED is turned on for illumination, it gets excessively hot without any regulator. When temperature of the LED is excessively high, there is light attenuation and in the worst case thermal breakdown.

The present invention is therefore intended to obviate or at least alleviate the problems encountered in prior art.

SUMMARY OF INVENTION

It is the primary objective of the present invention to provide an intelligent LED streetlight circuit for preventing thermal breakdown.

To achieve the foregoing objectives, the LED streetlight circuit includes an AC power supply, a switching circuit, an output controller and an LED array connected to the output controller. The switching circuit includes an EMI filter connected to the AC power supply, a power factor corrector connected to the EMI filter, a transformer connected to the power factor corrector, a rectifier/filter connected to the transformer, a standby power supply connected to the power factor corrector, a controller connected to the transformer, an luminance regulator connected to the controller, an optical coupler controlling loop connected to the controller and the rectifier/filter, and an optically controlled switch for connecting the standby power supply to the optical coupler controlling loop. The output controller includes a CC/CV controller connected to the rectifier/filter and the optical coupler controlling loop, an output voltage regulator connected to the CC/CV controller, and an output current regulator connected to the CC/CV controller.

The controller is an integrated controller including a PFC controller and a PWM controller.

The power factor corrector includes an inductor, a switching tube, a rectifying tube and a filtering capacitor.

The luminance regulator includes a thermistor, an optical coupler and an optical coupler.

The thermistor is a negative temperature coefficient thermistor.

The optically controlled switch includes a photo-resistor, an optical coupler and an optical coupler.

The photo-resistor is a negative temperature coefficient photo-resistor.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
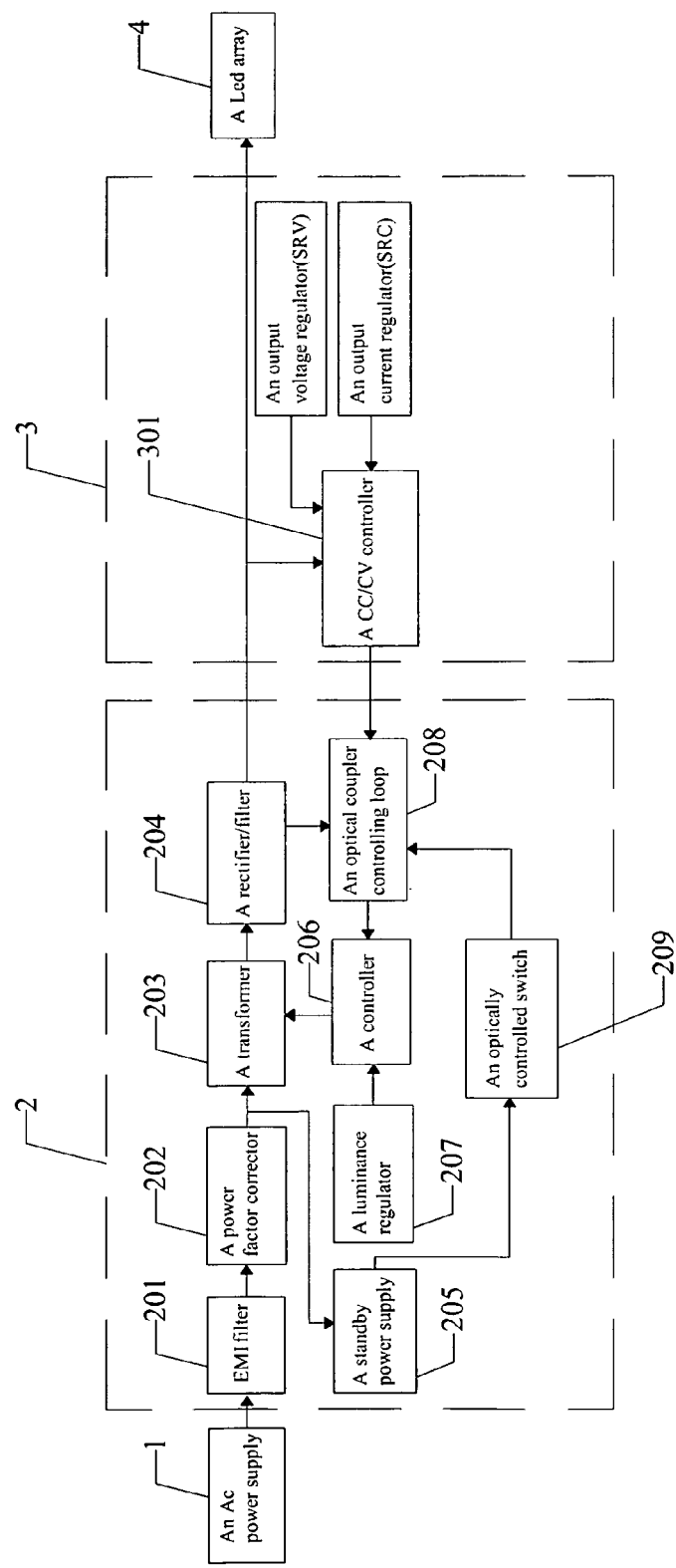
FIG. 1 is a block diagram of an LED streetlight circuit according to the preferred embodiment of the present invention.

Referring to FIGS. 1 through 6, there is shown an LED streetlight circuit according to the preferred embodiment of the present invention. The LED streetlight circuit includes an AC power supply 1, a switching circuit 2 connected to the AC power supply 1, an output controller 3 connected to the switching circuit 2, and an LED array 4 connected to the output controller 3.

The switching circuit 2 includes an EMI filter 201, a power factor corrector 202, a transformer 203, a rectifier/filter 204, a standby power supply 205, a controller 206, a luminance regulator 207, an optical coupler controlling loop 208 and an optically controlled switch 209. The EMI filter 201 is connected to the AC power supply 1. The power factor corrector 202 is connected to the EMI filter 201, a transformer 203 connected to the power factor corrector 202, and a rectifier/filter 204 connected to the transformer 203. The standby power supply 205 is connected to the power factor corrector 202. The controller 206 connected to the transformer 203. The luminance regulator 207 is connected to the controller 206. The optical coupler controlling loop 208 is connected to the controller 206. An input of the optically controlled switch 209 is connected to an output of the standby power supply 205. An output of the optically controlled switch 209 is connected to an input of the optical coupler controlling loop 208.

Figure 2:
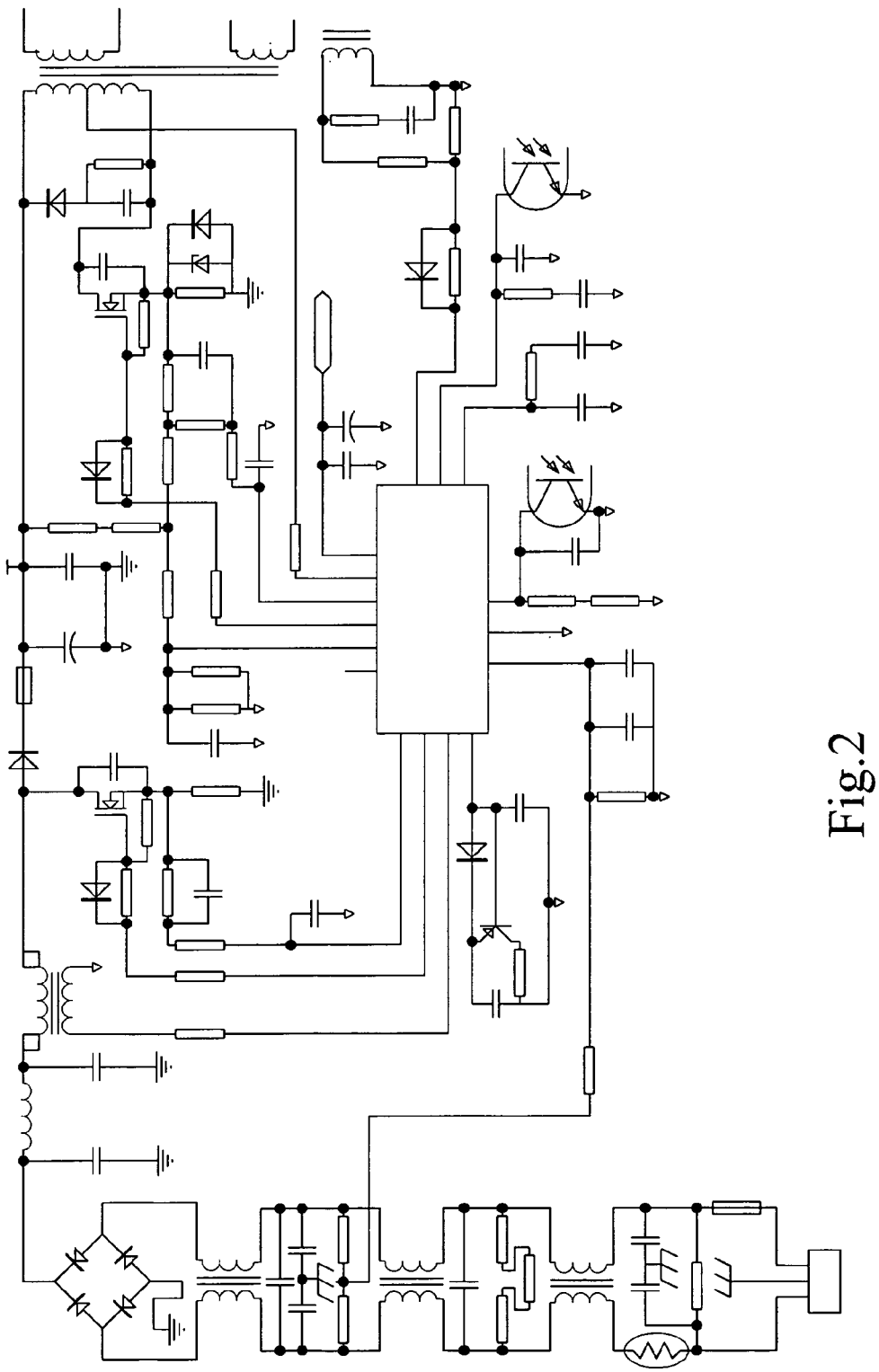
FIG. 2 is a diagram of a switching circuit of the LED streetlight circuit shown in FIG. 1.

Referring to FIG. 2, the power factor corrector 202 includes an inductor 1L2, a switching tube 1Q1, a rectifying tube 1D1 and a filtering capacitor 1E1. The power factor corrector 202 is used to increase the power operating factor to increase the effective power output for environmental protection. Thus, the economy of the operation of the LED array 4 is increased.

Figure 3:
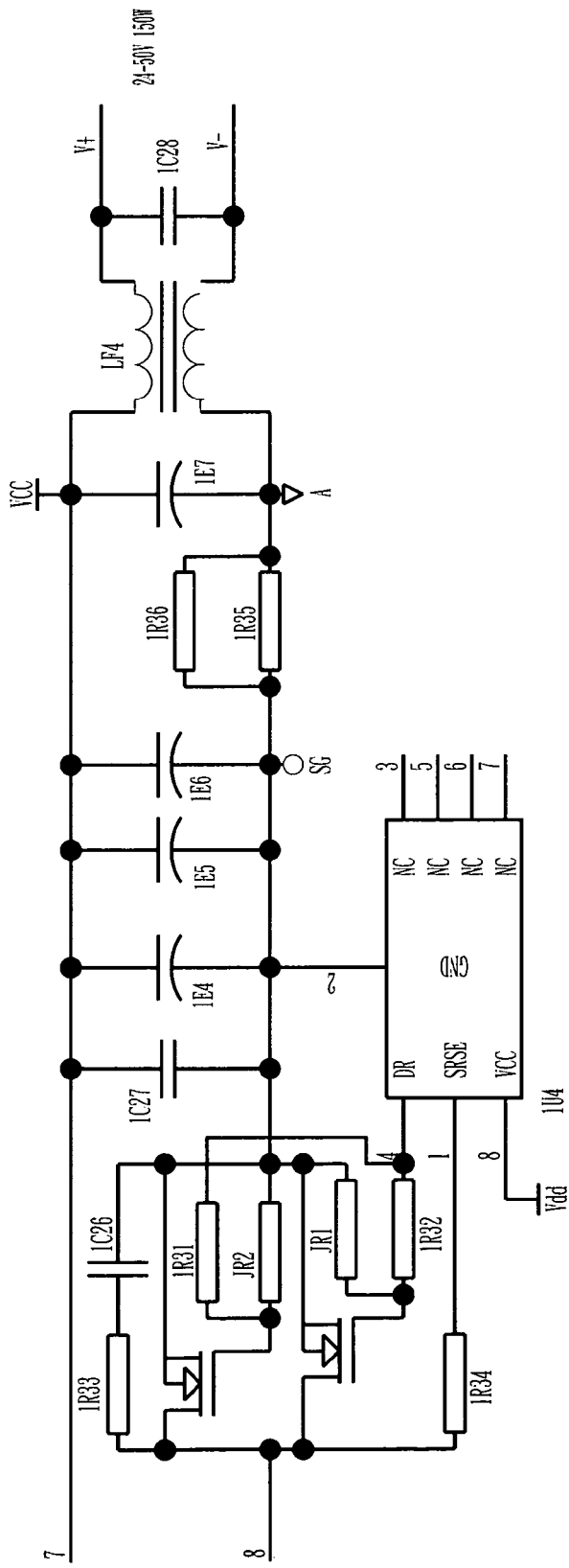
FIG. 3 is a circuit diagram of a rectifier/filter of the switching circuit shown in FIG. 2.

Referring to FIG. 3, the rectifier/filter 204 includes a plurality of elements. The rectifier/filter 204 will not be described in detail for not being the spirit of the present invention.

The controller 206 is an integrated device in which a PFC controller is integrated with a PWM controller. By integrating the PFC controller with the PWM controller, the controller 206 exhibits excellent performance and provides thorough protection, and the number of elements is small, and the design is simple, and the material cost is low. The power consumption is lower than 0.5 watts in the static state, and the power factor correction value is higher than 0.90, and the average energy efficiency is higher than 0.90.

Figure 5:
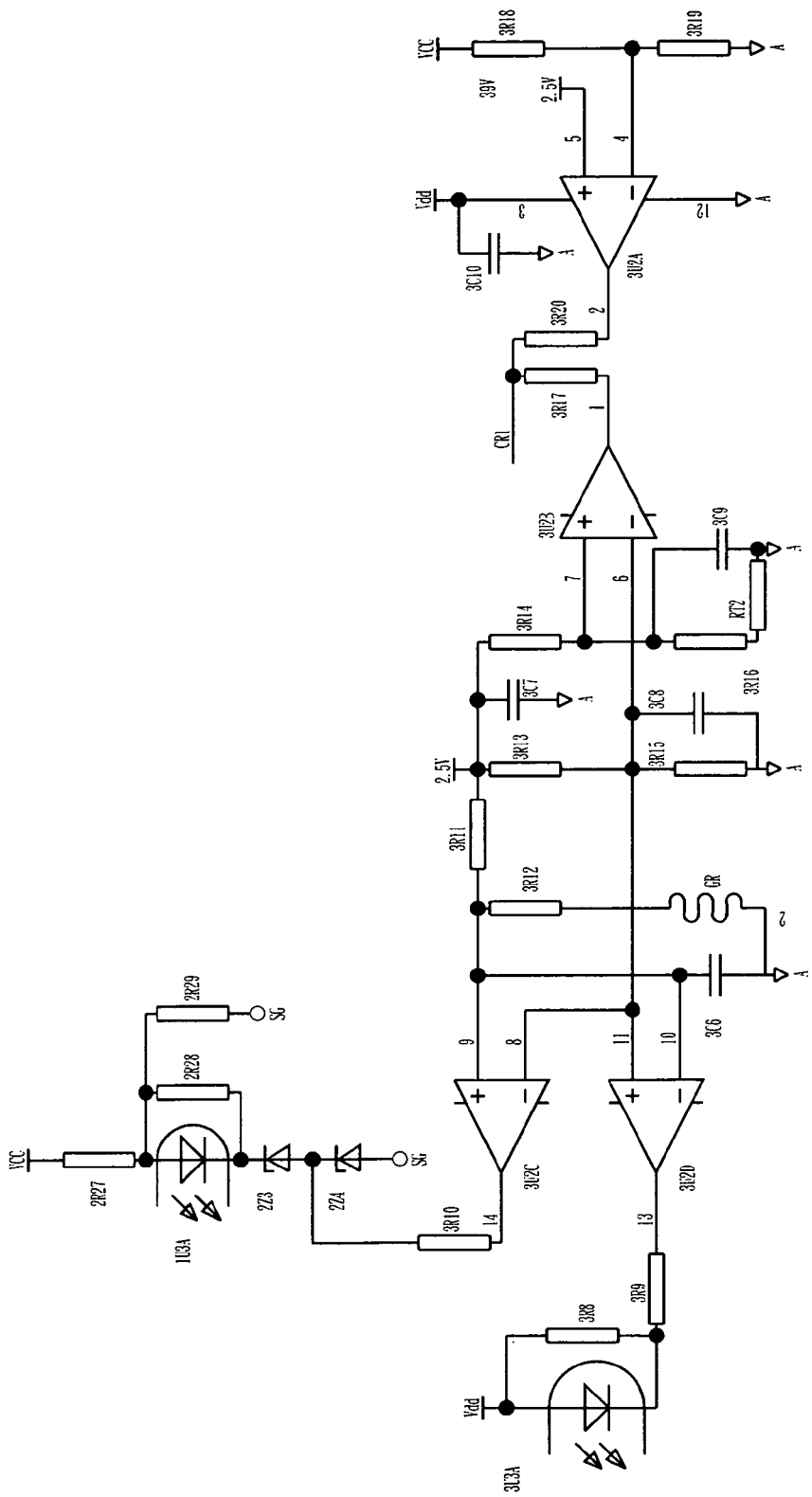
FIG. 5 is a circuit diagram of a luminance regulator of the switching circuit shown in FIG. 2.

Referring to FIG. 5, the luminance regulator 207 includes a negative temperature coefficient thermistor RT2, an optical coupler 3U2 and an optical coupler 2U1. The luminance regulator 207 will not be described in detail for not being the spirit of the present invention.

Figure 4:
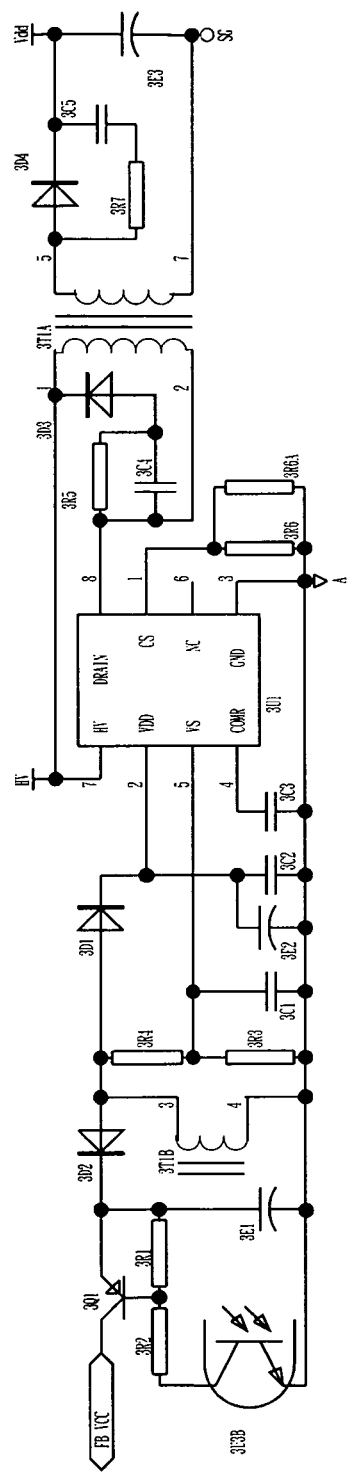
FIG. 4 is a circuit diagram of an optically controlled switch of the switching circuit shown in FIG. 2.

Referring to FIG. 4, the optically controlled switch 209 includes a negative temperature coefficient photo-resistor GR, an optical coupler 3U2 and an optical coupler 2U1. The optically controlled switch 209 will not be described in detail for not being the spirit of the present invention.

Figure 6:
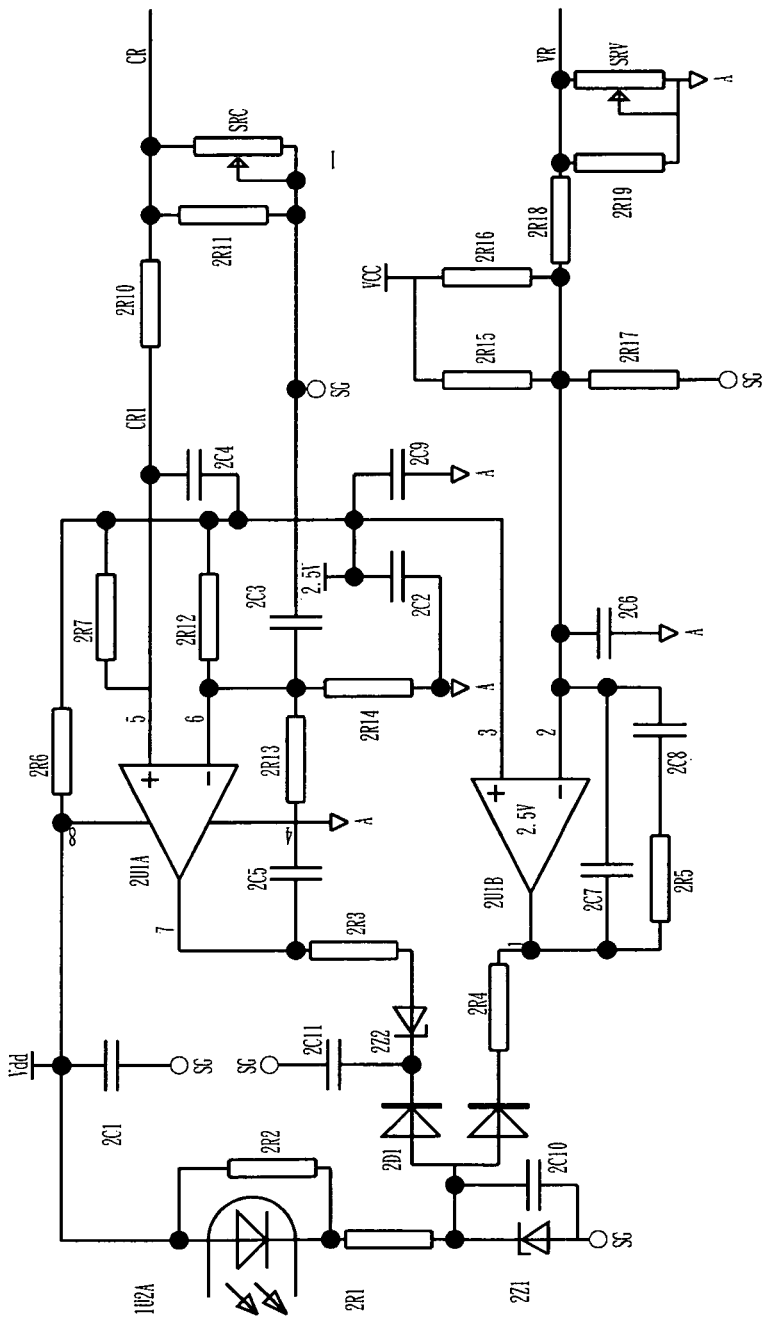
FIG. 6 is a circuit diagram of an output controller of the LED streetlight circuit shown in FIG. 1.

Referring to FIG. 6, the output controller 3 includes a CC/CV controller 301 connected to the rectifier/filter 2004 and the optical coupler controlling loop 208, an output voltage regulator SRV connected to the CC/CV controller 301, and an output current regulator SRC connected to the CC/CV controller 301. The output voltage regulator SRV can be operated manually to regulate the output voltage while the output current regulator SRC can be operated manually to regulate the output current.

As the luminance of the LED array 4 gets higher, the temperature of the LED array 4 gets higher. There is a positive relationship between the luminance and the temperature. Hence, the temperature of the LED array 4 can be used to detect the status of the LED array 4 and regulate the luminance of the LED array 4. Thus, the temperature of the LED array 4 is stable, i.e., not excessively high while the luminance of the LED array 4 is acceptable, and the light attenuation of the LED array 4 is reduced effectively.

When the negative temperature coefficient thermistor RT2 detects that the temperature of the LED array 4 is excessively high, the resistance of the negative temperature coefficient thermistor RT2 gets lower. When the temperature of the LED array 4 reaches a predetermined upper limit, 3U2B provides a low level to reduce the voltage at CR1. Thus, the voltage reference at 2U1A is reduced. 2U1A sends a signal to an optical coupler 1U2A and sends a feedback to a PWM controller 1U1 through 1U2B. The PWM controller 1U1 sends a reduced PWM signal to reduce the output current to reduce the luminance of the LED array 4 to extend the life of the LED array 4. When the temperature detector RT2 detects that the temperature of the LED array 4 reaches a predetermined lower limit, automatic regulation is conducted to increase the luminance of the LED array 4.

As the night comes, the negative temperature coefficient photo-resistor GR detects that the environment is getting dark, and the resistance of the negative temperature coefficient photo-resistor GR gets higher to cause the optical coupler 3U2D to provide a low level. Thus, there is a current through the optical coupler 3U3A to turn on 3U3B and 3Q1, and electricity is provided to the PWM controller 1U1 again. Thus, the PWM controller 1U1 starts to work again to turn on the LED array 4.

As the dawn comes, the negative temperature coefficient photo-resistor GR detects that the environment is getting bright, the resistance of the negative temperature coefficient photo-resistor GR gets lower to cause the optical coupler 3U2D to provide a high level. Thus, the optical coupler 3U3A is turned off, and so are the 3U3B and 3Q1. Moreover, the supply of power to the PWM controller 1U1 is terminated, and the PWM controller 1U1 stops working, i.e., stop providing a voltage output. Thus, the LED array 4 is turned off.

Based on the brightness in the environment, the optically controlled switch 209 turns the LED array 4 on and off to realize unmanned, intelligent control of the LED streetlight.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An LED streetlight circuit including an AC power supply (1), a switching circuit (2), an output controller (3), and an LED array (4) connected to the output controller (3), wherein the switching circuit (2) includes an EMI filter (201) connected to the AC power supply (1), a power factor corrector (202) connected to the EMI filter (201), a transformer (203) connected to the power factor corrector (202), a rectifier/filter (204) connected to the transformer (203), a standby power supply (205) connected to the power factor corrector (202), a controller (206) connected to the transformer (203), an luminance regulator (207) connected to the controller (206), an optical coupler controlling loop (208) connected to the controller (206) and the rectifier/filter (204), and an optically controlled switch (209) for connecting the standby power supply (205) to the optical coupler controlling loop (208), wherein the output controller (3) includes a CC/CV controller (301) connected to the rectifier/filter (204) and the optical coupler controlling loop (208), an output voltage regulator (SRV) connected to the CC/CV controller (301), and an output current regulator (SRC) connected to the CC/CV controller (301).

2. The LED streetlight circuit according to claim 1, wherein the controller (206) is an integrated controller including a PFC controller and a PWM controller.

3. The LED streetlight circuit according to claim 2, wherein the power factor corrector (202) includes an inductor (1L2), a switching tube (1Q1), a rectifying tube (1D1) and a filtering capacitor (1E1).

4. The LED streetlight circuit according to claim 3, wherein the luminance regulator (207) includes a thermistor (RT2), an optical coupler (2U1) and an optical coupler (3U2).

5. The LED streetlight circuit according to claim 4, wherein the thermistor (RT2) is a negative temperature coefficient thermistor.

6. The LED streetlight circuit according to claim 5, wherein the optically controlled switch (209) includes a photo-resistor (GR), an optical coupler (2U1) and an optical coupler (3U2).

7. The LED streetlight circuit according to claim 6, wherein the photo-resistor (GR) is a negative temperature coefficient photo-resistor.

* * * * *